US011871861B2

United States Patent
Pearce et al.

(10) Patent No.: US 11,871,861 B2
(45) Date of Patent: Jan. 16, 2024

(54) CUSHIONS COMPRISING A NON-SLIP ELASTOMERIC CUSHIONING ELEMENT

(71) Applicant: Purple Innovation, LLC, Alpine, UT (US)

(72) Inventors: Tony M. Pearce, Alpine, UT (US);
Terry V. Pearce, Alpine, UT (US);
Russell B Whatcott, Eagle Mountain, UT (US)

(73) Assignee: Purple Innovation, LLC, Lehi, UT (US)

( * ) Notice: Subject to any disclaimer, the term of this patent is extended or adjusted under 35 U.S.C. 154(b) by 102 days.

(21) Appl. No.: 15/058,637

(22) Filed: Mar. 2, 2016

(65) Prior Publication Data
US 2016/0262561 A1 Sep. 15, 2016

(51) Int. Cl.
*B32B 7/08* (2019.01)
*A47G 27/02* (2006.01)
*B29C 45/14* (2006.01)
*B32B 3/30* (2006.01)
*B32B 3/26* (2006.01)
*B29K 21/00* (2006.01)
(Continued)

(52) U.S. Cl.
CPC ..... *A47G 27/0212* (2013.01); *A47G 27/0225* (2013.01); *B29C 45/14311* (2013.01); *B32B 3/266* (2013.01); *B32B 3/30* (2013.01); *B32B 7/08* (2013.01); *B29C 2045/14319* (2013.01); *B29C 2045/14327* (2013.01); *B29C 2045/14803* (2013.01); *B29K 2021/003* (2013.01); *B29L 2009/00* (2013.01); *B29L 2031/7324* (2013.01)

(58) Field of Classification Search
CPC .......... Y10T 428/24322–24347; B32B 3/266;
B32B 2307/744; B32B 2471/00; B32B
2471/04; B60N 3/04; B60N 3/044; B60N
3/06; B60N 3/08; B29L 2031/732; B29L
2031/7324; A47C 27/085; A47C
27/14–16; E04F 15/22; E04F 15/225;
E04F 15/185; E01C 5/18; A42B 3/12–124
See application file for complete search history.

(56) References Cited

U.S. PATENT DOCUMENTS 3,434,715 A * 3/1969 Brantingham ..... A63B 21/4037
482/79
4,369,284 A 1/1983 Chen
(Continued)

*Primary Examiner* — Z. Jim Yang
(74) *Attorney, Agent, or Firm* — DENTONS Durham Jones Pinegar

(57) ABSTRACT

A cushion includes a cover and a cushioning element having a top surface heat-fused to the cover. The cushioning element comprises an elastomeric material having a plurality of voids formed therein. At least 60% of a bottom surface of the cushioning element is exposed such that when the cushion is disposed over a surface at least 60% of the bottom surface of the cushioning element is in direct contact with the surface. Methods of forming the cushion include disposing a cover adjacent a mold, conforming the cover to a selected shape of the mold, injecting molten elastomeric material into the mold, bonding the molten elastomeric material to the cover, solidifying the molten elastomeric material to form the cushioning element, and separating the mold from the cover. The cushioning element maintains the cover in the selected shape.

20 Claims, 6 Drawing Sheets

(51) Int. Cl.
*B29L 9/00* (2006.01)
*B29L 31/00* (2006.01)

(56) References Cited

U.S. PATENT DOCUMENTS

| | | | |
|---|---|---|---|
| 5,573,272 A * | 11/1996 | Teshima | B60R 21/0428 |
| | | | 296/146.7 |
| 5,749,111 A | 5/1998 | Pearce | |
| 5,972,470 A * | 10/1999 | Engst | C09K 3/32 |
| | | | 428/140 |
| 5,994,450 A | 11/1999 | Pearce | |
| 6,026,527 A | 2/2000 | Pearce | |
| 6,372,323 B1 * | 4/2002 | Kobe | B25G 1/10 |
| | | | 4/581 |
| 6,564,397 B1 * | 5/2003 | Hawley | A47K 3/002 |
| | | | 4/581 |
| 6,797,765 B2 | 9/2004 | Pearce | |
| 6,835,015 B2 | 12/2004 | Pearce | |
| 6,851,141 B2 | 2/2005 | McMahan | |
| 6,865,759 B2 | 3/2005 | Pearce | |
| 6,969,548 B1 * | 11/2005 | Goldfine | A41D 13/015 |
| | | | 264/46.7 |
| 7,000,966 B2 | 2/2006 | Kramarczyk et al. | |
| 7,076,822 B2 | 7/2006 | Pearce | |
| 7,665,159 B2 | 2/2010 | Fowkes | |
| 7,730,566 B2 | 6/2010 | Flick et al. | |
| 7,823,233 B2 | 11/2010 | Flick et al. | |
| 7,827,636 B2 | 11/2010 | Flick et al. | |
| 7,964,664 B2 | 6/2011 | Pearce | |
| 8,424,137 B1 * | 4/2013 | Pearce | A47C 27/085 |
| | | | 5/655.5 |
| 8,434,748 B1 | 5/2013 | Pearce et al. | |
| 8,607,387 B2 | 12/2013 | Flick et al. | |
| 8,628,067 B2 | 1/2014 | Pearce et al. | |
| 8,844,889 B2 * | 9/2014 | Smith | A47B 91/04 |
| | | | 428/98 |
| 8,919,750 B2 | 12/2014 | Pearce et al. | |
| 9,771,013 B1 | 9/2017 | Delanghe | B32B 3/266 |
| 2002/0017805 A1 * | 2/2002 | Carroll, III | B32B 27/304 |
| | | | 188/371 |
| 2002/0119291 A1 * | 8/2002 | Hainbach | E04F 15/10 |
| | | | 264/320 |
| 2003/0186025 A1 * | 10/2003 | Scott | E04F 15/185 |
| | | | 428/119 |
| 2005/0129910 A1 * | 6/2005 | Chang | B32B 27/12 |
| | | | 428/138 |
| 2005/0260385 A1 * | 11/2005 | Cowelchuk | B32B 27/32 |
| | | | 428/138 |
| 2006/0165949 A1 * | 7/2006 | Segars | D06N 7/0081 |
| | | | 428/95 |
| 2007/0193149 A1 * | 8/2007 | Chang | B32B 5/245 |
| | | | 52/302.1 |
| 2007/0202316 A1 * | 8/2007 | Turnbach | B32B 3/266 |
| | | | 428/95 |
| 2007/0261344 A1 * | 11/2007 | Proulx | B29C 43/30 |
| | | | 52/403.1 |
| 2009/0013472 A1 * | 1/2009 | Koffler | A47C 27/15 |
| | | | 5/652.1 |
| 2010/0129573 A1 * | 5/2010 | Kim | B32B 3/08 |
| | | | 156/263 |
| 2010/0218317 A1 * | 9/2010 | Flick | A61G 7/05715 |
| | | | 5/655.5 |
| 2010/0229308 A1 * | 9/2010 | Pearce | A47C 27/16 |
| | | | 5/652 |
| 2010/0237082 A1 * | 9/2010 | Fernandez | A47C 27/16 |
| | | | 428/152 |
| 2010/0295221 A1 * | 11/2010 | Kligerman | F16F 1/373 |
| | | | 267/140.11 |
| 2011/0076457 A1 * | 3/2011 | Reichwein | B32B 25/14 |
| | | | 428/156 |
| 2011/0133376 A1 * | 6/2011 | Hackett | B29C 45/14778 |
| | | | 267/145 |
| 2011/0151174 A1 * | 6/2011 | Hainbach | B32B 25/10 |
| | | | 428/218 |
| 2012/0117909 A1 * | 5/2012 | Reichwein | E04F 15/22 |
| | | | 52/578 |
| 2012/0164369 A1 * | 6/2012 | Tardif | B32B 27/32 |
| | | | 428/138 |
| 2012/0189819 A1 * | 7/2012 | Chang | B32B 3/30 |
| | | | 428/218 |
| 2012/0244312 A1 * | 9/2012 | Pearce | A47C 27/10 |
| | | | 428/136 |
| 2013/0000045 A1 * | 1/2013 | Losio | A47C 21/046 |
| | | | 5/655.5 |
| 2013/0071609 A1 * | 3/2013 | Masse | B32B 3/30 |
| | | | 428/116 |
| 2013/0111836 A1 * | 5/2013 | Masanek, Jr. | E04B 5/48 |
| | | | 52/302.1 |
| 2013/0142984 A1 * | 6/2013 | Kuo | A43B 1/0009 |
| | | | 428/117 |
| 2013/0171897 A1 * | 7/2013 | Hsu Tang | B32B 5/20 |
| | | | 442/76 |
| 2014/0005583 A1 * | 1/2014 | Cardinali | A61F 5/0123 |
| | | | 602/5 |
| 2014/0050895 A1 * | 2/2014 | Hsueh | B32B 3/30 |
| | | | 428/172 |
| 2014/0099464 A1 * | 4/2014 | Archbold | B29C 51/268 |
| | | | 428/137 |
| 2014/0113110 A1 * | 4/2014 | Johnson | B29C 39/10 |
| | | | 264/250 |
| 2014/0183789 A1 | 7/2014 | Whatcott et al. | |
| 2014/0302271 A1 * | 10/2014 | Losio | B32B 7/04 |
| | | | 264/129 |
| 2014/0342118 A1 * | 11/2014 | Connaughton | A63B 6/00 |
| | | | 428/218 |
| 2014/0349039 A1 * | 11/2014 | Finell | A47G 11/006 |
| | | | 428/33 |
| 2015/0251375 A1 * | 9/2015 | Lin | B32B 3/266 |
| | | | 428/319.3 |
| 2015/0335166 A9 | 11/2015 | Pearce et al. | |
| 2016/0023424 A1 * | 1/2016 | Lu | B32B 5/32 |
| | | | 428/134 |
| 2016/0075100 A1 * | 3/2016 | Kuo | B32B 5/26 |
| | | | 428/137 |
| 2016/0150835 A1 * | 6/2016 | Salmini | A41D 13/08 |
| | | | 428/137 |
| 2017/0043695 A1 * | 2/2017 | Kitamoto | B60N 2/7017 |
| 2017/0347801 A1 * | 12/2017 | Kim | B32B 3/12 |
| 2018/0290419 A1 * | 10/2018 | Vizen | B32B 1/00 |

\* cited by examiner

CUSHIONS COMPRISING A NON-SLIP ELASTOMERIC CUSHIONING ELEMENT

CROSS-REFERENCE TO RELATED APPLICATION

This application claims the benefit of U.S. Provisional Patent Application Ser. No. 62/130,364, filed Mar. 9, 2015, the disclosure of which is hereby incorporated herein in its entirety by this reference.

TECHNICAL FIELD

The invention, in various embodiments, relates generally to cushions, such as mats, comprising elastomeric cushioning elements that provide a non-slip surface, and to methods of forming such cushions.

BACKGROUND

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for humans or animals, and may protect objects from damage. Cushioning materials may be formed of materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications.

Floor mats may comprise cushioning materials to provide support for a person standing, lying, kneeling, etc., on the mat. Conventionally, the cushioning materials are enclosed or covered by additional layers of material such that the cushioning materials do not contact the surface over which the mat is placed. For example, floor mats are often provided with non-slip surfaces over the cushioning materials to reduce slippage and promote safety.

For example, U.S. Pat. No. 7,665,159 describes a bathtub cushion including elastomeric gel cushions formed within a recess of the bathtub cushion. The gel cushions are enclosed within the recess by a foam mat and a scrim, which serves as a backing material for the gel cushion. The bathtub cushion further includes suction cups, magnets, or weights mounted to the cushion to prevent movement of the cushion and retain the cushion on the bottom or around the sides of a bathtub.

U.S. Pat. No. 6,851,141 describes an anti-fatigue mat including a gel inner layer surrounded by upper and lower cover members. The external surface of the upper and lower cover members exhibit anti-slip properties. For example, the anti-slip surface of the upper and lower cover members is textured or variegated so as to exhibit more friction than a smooth external surface.

BRIEF SUMMARY

In some embodiments, the present disclosure includes a cushion comprising a cover and a cushioning element having a top surface heat-fused to the cover. The cushioning element comprises an elastomeric material having a plurality of voids formed therein. At least 60% of a bottom surface of the cushioning element is exposed such that when the cushion is disposed over a surface at least 60% of the bottom surface of the cushioning element is in direct contact with the surface.

In other embodiments, the present disclosure includes methods of forming a cushion. The method comprises disposing a cover adjacent a mold, conforming the cover to a selected shape of a cavity in the mold, injecting a molten elastomeric material into the mold, bonding the molten elastomeric material to the cover, solidifying the molten elastomeric material to form a cushioning element having a plurality of voids formed therein, and separating the mold from the cover. The cushioning element maintains the cover in the selected shape after the mold is separated from the flexible material.

Another method of forming a cushion includes forming a cushioning element of an elastomeric material, securing a cover to the cushioning element, and conforming the cover to a shape of a top surface of the cushioning element.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
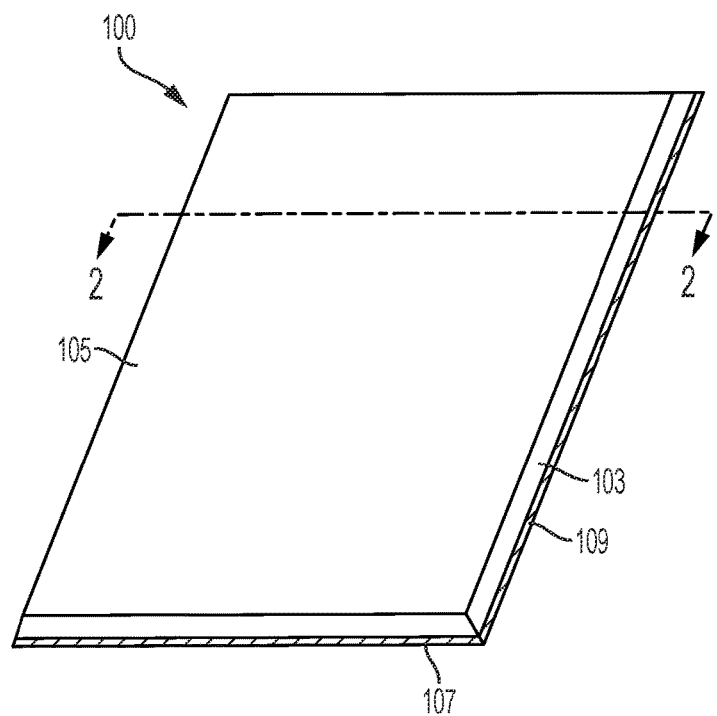
FIG. 1 is a perspective view of a cushion according to embodiments of the present disclosure.

As used herein, the term "cushioning element" means and includes any deformable device intended for use in cushioning one body relative to another. As a non-limiting example, cushioning elements (e.g., mats, pads, etc.) include materials intended for use in cushioning a person, animal, or object relative to another object (e.g., a floor) that might otherwise abut against the person, animal or object.

As used herein, the term "elastomeric polymer" means and includes a polymer capable of recovering its original size and shape after deformation. In other words, an elastomeric polymer is a polymer having elastic or viscoelastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility, softness, or extensibility of the material. Plasticizers include, without limitation, hydrocarbon fluids, such as mineral oils. Hydrocarbon plasticizers may be aromatic or aliphatic.

As used herein, the term "elastomeric material" means and includes elastomeric polymers and mixtures of elastomeric polymers with plasticizers and/or other materials. Elastomeric materials are elastic (i.e., capable of recovering size and shape after deformation). Elastomeric materials include, without limitation, materials referred to in the art as "elastomer gels," "gelatinous elastomers," or simply "gels."

As used herein, any relational term, such as "first," "second," "top," "bottom," etc., is used for clarity and convenience in understanding the disclosure and accompanying drawings and does not connote or depend on any specific preference, orientation, or order, except where the context clearly indicates otherwise.

As used herein, the term "and/or" means and includes any and all combinations of one or more of the associated listed items.

The illustrations presented herein are not meant to be actual views of any particular component, device, or system, but are merely idealized representations, which are employed to describe embodiments of the present disclosure. Elements common between figures may retain the same numerical designation.

The present disclosure describes a cushion that may be used to provide a non-slip or high friction surface against a surface over which the cushion is disposed. In some embodiments, the cushion may be used to cover a flooring surface and provide support to a person or animal standing, laying, sitting, or kneeling thereon. The cushion may be used as a bath mat, a kitchen mat, a yoga or exercise mat, a prayer mat, an area rug, wall-to-wall carpeting, seat cushions, and the like. The cushion may also be configured for use as sporting equipment. For example, the cushion may form part of wearable padding configured to prevent sports-related injuries, such as shin guards, sparring gear, and the like. Thus, the cushion may provide a non-slip surface against any surface, including, for example, flooring and a portion of the human body, on which movement of the cushion during use is undesirable.

FIG. 1 illustrates a perspective view of a cushion 100 according to some embodiments of the present disclosure. The cushion 100 may have a top surface 105 and a bottom surface 107. In some embodiments, the cushion 100 may have a tapered edge 103 at a periphery of the cushion 100 extending between the top surface 105 and the bottom surface 107 of the cushion 100. Edging 109 or trimming may be provided at and extend along the periphery of the cushion 100 to add to the aesthetics of the cushion 100.

In some embodiments, the tapered edge 103 may be tapered at an acute angle measured from the bottom surface 107. For example, the cushion 100 may taper at an angle of about 45 degrees. In other embodiments, the cushion 100 may have a straight edge rather than a tapered edge 103. The straight edge may be perpendicular to and extend between the top surface 105 and the bottom surface 107. In yet further embodiments, the edge extending between the top surface 105 and the bottom surface 107 may have any other shape.

In some embodiments, the top surface 105 and/or bottom surface 107 may be a flat surface. In other embodiments, the top surface 105 and/or bottom surface 107 may have any shape, including a domed-shape or other three-dimensional shape. For example, the cushion 100 may have a curved shape that conforms to the shape of a person's shin when the cushion 100 is intended for use as wearable padding, such as a shin guard.

In some embodiments, the edging 109 may comprise piping. The piping may be formed of a woven fabric, a non-woven fabric, foam, and the like. In other embodiments, the edging 109 may be formed of an elastomeric material similar to an elastomeric material used to form a cushioning element 102 to add to the non-slip capabilities of the cushion 100 (FIG. 2).

Figure 2:
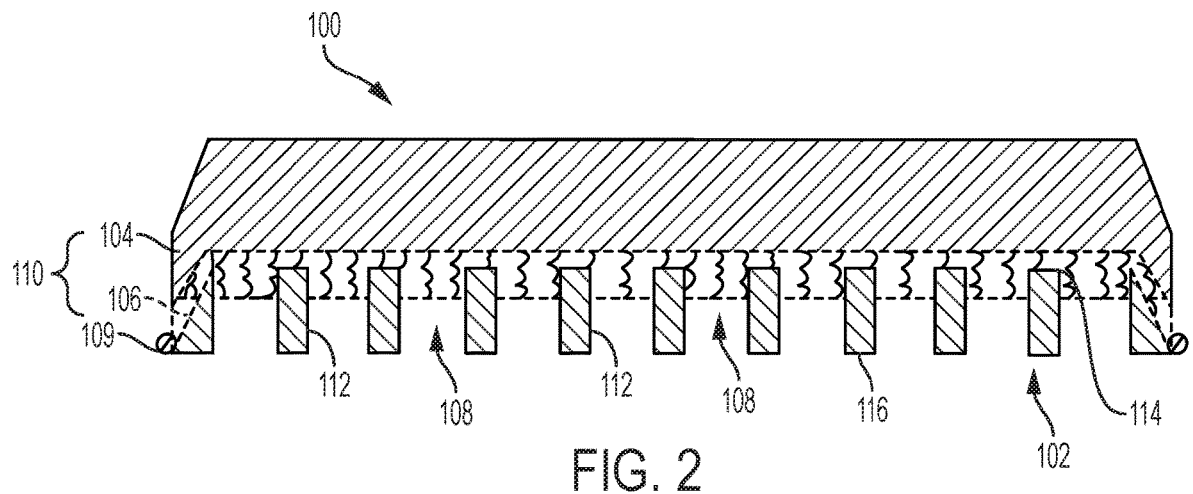
FIG. 2 is a cross-sectional view of the cushion of FIG. 1.

FIG. 2 illustrates a cross-sectional side view of the cushion 100 of FIG. 1 taken along the line 2 according to some embodiments of the present disclosure. The cushion 100 may comprise an elastomeric cushioning element 102 disposed under a top layer 104. An intermediate layer 106 may optionally be provided between the cushioning element 102 and the top layer 104, as indicated by the dashed outline of the intermediate layer 106. As used herein, the term "cover 110" is used to refer to the top layer 104 provided over the cushioning element 102 without the intermediate layer 106 and to refer to the top layer 104 and the intermediate layer 106 collectively.

The elastomeric cushioning element 102 may comprise walls 112 of elastomeric material defining a plurality of voids 108 formed therein. The cushioning element 102 may have a top surface defined by a top surface 114 of the walls 112 that contacts the cover 110, and may have a bottom surface defined by a bottom surface 116 of the walls 112. In some embodiments, the voids 108 may extend completely through the cushioning element 102. In other embodiments, the voids 108 may extend partially through the cushioning element 102.

The bottom surface 116 of the walls 112 may define the bottom surface 107 of the cushion 100. In some embodiments, the cushion 100 may lack additional layers or devices attached to the bottom surface 107 thereof. In other words, substantially the entire bottom surface 116 of the walls 112 may be exposed such that substantially the entire bottom surface 116 directly contacts a surface over which the cushion 100 is disposed during use. For example, the bottom surface 107 may lack devices such as suction cups, silicone dots, or other textured fabrics or surfaces used to provide a non-slip surface. In other embodiments, additional layers may be provided over a portion of the bottom surface 107. For example, a polymeric film of thermoplastic polyurethane or polyvinyl chloride may be provided over a portion of the bottom surface 107 to prevent water and other fluids from contacting the elastomeric material of the cushioning element 102. In such embodiments, the bottom surface 107 may lack any additional layers over at least 60% of the surface area of the bottom surface 107. Thus, when the cushion 100 is disposed over a surface during use, 60% of the bottom surface 107 is in direct contact with the surface. In other embodiments, the bottom surface 107 may lack any additional layers over at least 80% of the surface area of the bottom surface 107. Thus, when the cushion 100 is disposed over a surface during use, 80% of the bottom surface 107 is in direct contact with the surface.

In some embodiments, the cushion 100 may be intended for use as a cushioned floor mat or other cover for a flooring surface. In such embodiments, the cushion 100 may be disposed over and in direct contact with the flooring surface, and may be formulated and configured to provide a non-slip surface against the flooring surface. In other embodiments, the cushion 100 may be intended for use as a seat cushion. In such embodiments, the cushion 100 may be disposed over and in direct contact with a seating surface, such as a chair, a stool, an automobile seat, and the like, and may be formulated and configured to provide a non-slip surface against the seating surface. In yet further embodiments, the cushion 100 may be intended for use as padding or other sporting equipment configured to prevent sports-related injuries. The cushion 100 may provide a non-slip surface against a portion of the human body. In such embodiments, the cushion 100 may be disposed over and in direct contact with a portion of the human body, including directly contacting skin, or indirectly contacting a portion of the human body covered by clothing and the like.

The cushioning element 102 may be formed of an elastomeric material. Elastomeric materials are described in, for example, U.S. Pat. No. 6,797,765, titled "Gelatinous Elastomer," issued Sep. 28, 2004; U.S. Pat. No. 5,994,450, titled "Gelatinous Elastomer and Methods of Making and Using the Same and Articles Made Therefrom," issued Nov. 30, 1999 (hereinafter "the '450 Patent"); U.S. Pat. No. 7,964,664, titled "Gel with Wide Distribution of MW in Mid-Block" issued Jun. 21, 2011; U.S. Pat. No. 4,369,284, titled "Thermoplastic Elastomer Gelatinous Compositions," issued Jan. 18, 1983; U.S. Pat. No. 8,919,750, titled "Cushioning Elements Comprising Buckling Walls and Methods of Forming Such Cushioning Elements," issued Dec. 30, 2014; the disclosures of each of which are incorporated herein in their entirety by this reference. The elastomeric material may include an elastomeric polymer and a plasticizer. The elastomeric material may be a gelatinous elastomer (also referred to in the art as gel, elastomer gel, or elastomeric gel), a thermoplastic elastomer, a natural rubber, a synthetic elastomer, a blend of natural and synthetic elastomers, etc.

The elastomeric polymer may be an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, TX, under the trade name SEPTON® 4055, and from Kraton Polymers, LLC, of Houston, TX, under the trade names KRATON® E1830, KRATON® G1650, and KRATON® G1651. In these examples, the "A" blocks are styrene. The "B" block may be rubber (e.g., butadiene, isoprene, etc.) or hydrogenated rubber (e.g., ethylene/propylene or ethylene/butylene or ethylene/ethylene/propylene) capable of being plasticized with mineral oil or other hydrocarbon fluids. The elastomeric material may include elastomeric polymers other than styrene-based copolymers, such as non-styrenic elastomeric polymers that are thermoplastic in nature or that can be solvated by plasticizers or that are multi-component thermoset elastomers.

The elastomeric material may include one or more plasticizers, such as hydrocarbon fluids. For example, elastomeric materials may include aromatic-free food-grade white paraffinic mineral oils, such as those sold by Sonneborn, Inc., of Mahwah, NJ, under the trade names BLANDOL® and CARNATION®.

In some embodiments, the elastomeric material may have a plasticizer-to-polymer ratio from about 0.1:1 to about 50:1 by weight. For example, elastomeric materials may have plasticizer-to-polymer ratios from about 1:1 to about 30:1 by weight, or even from about 1.5:1 to about 10:1 by weight. In further embodiments, elastomeric materials may have plasticizer-to-polymer ratios of about 2:1 by weight.

The elastomeric material may have one or more fillers (e.g., lightweight microspheres). Fillers may affect thermal properties, density, processing, etc., of the elastomeric material. For example, hollow microspheres (e.g., hollow glass microspheres or hollow acrylic microspheres) may decrease the thermal conductivity of the elastomeric material by acting as an insulator because such hollow microspheres (e.g., hollow glass microspheres or hollow acrylic microspheres) may have lower thermal conductivity than the plasticizer or the polymer. As another example, metal particles (e.g., aluminum, copper, etc.) may increase the thermal conductivity of the resulting elastomeric material because such particles may have greater thermal conductivity than the plasticizer or polymer. Microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change). The phase-change material may have a melting point from about 20° C. to about 45° C.

The elastomeric material may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl) propionate), commercially available as IRGANOX® 1010, from BASF Corp., of Iselin, NJ or as EVERNOX®-10, from Everspring Chemical Co., Ltd., of Taichung, Taiwan; octadecyl-3-(3,5-di-tert-butyl-4-hydroxyphenyl)propionate, commercially available as IRGANOX® 1076, from BASF Corp. or as EVERNOX® 76, from Everspring Chemical Co., Ltd.; and tris(2,4-di-tert-butylphenyl)phosphite, commercially available as IRGAFOS® 168, from BASF Corp. or as EVERFOS® 168, from Everspring Chemical Co., Ltd. One or more antioxidants may be combined in a single formulation of elastomeric material. The use of antioxidants in mixtures of plasticizers and polymers is described in columns 25 and 26 of the '450 Patent. The elastomeric material may include up to about 5 wt % antioxidants. For instance, the elastomeric material may include from about 0.10 wt % to about 1.0 wt % antioxidants.

In some embodiments, the elastomeric material may include a resin. The resin may be selected to modify the elastomeric material to slow a rebound of the cushioning element 100 after deformation. The resin, if present, may include a hydrogenated pure monomer hydrocarbon resin, such as those commercially available from Eastman Chemical Company, of Kingsport, TN, under the trade name REGALREZ®. The resin, if present, may function as a tackifier, increasing the stickiness of a surface of the elastomeric material.

In some embodiments, the elastomeric material may include a pigment or a combination of pigments. Pigments may be aesthetic and/or functional. That is, pigments may provide a cushioning element 102 with an appearance appealing to consumers. In addition, a cushioning element 102 having a dark color may absorb radiation differently than a cushioning element 102 having a light color. For example, the elastomeric material may comprise 0.25% by weight HORIZON BLUE™ pigment commercially available from DAY-GLO™ of Cleveland, OH.

The elastomeric material may include any type of gelatinous elastomer. For example, the elastomeric material may include a melt-blend of one part by weight of a styrene-ethylene-ethylene-propylene-styrene (SEEPS) elastomeric triblock copolymer (e.g., SEPTON® 4055) with two parts by weight of a 70-weight straight-cut white paraffinic mineral oil (e.g., CARNATION® white mineral oil) and, optionally, pigments, antioxidants, and/or other additives.

The elastomeric material may include a material that may return to its original shape after deformation, and that may be elastically stretched to many times its original size. The elastomeric material may be rubbery in feel, but may deform to the shape of an object applying a deforming pressure better than conventional rubber materials, and may have a durometer hardness lower than conventional rubber materials. For example, the elastomeric material may have a hardness on the Shore A scale of less than about 50, from about 0.1 to about 50, or less than about 5. Elastomeric materials, which are thermoplastic in nature, may be stronger, for example, five to ten times stronger in tensile strength or yield strength, than conventional thermoset cushioning gels, such as polyurethane and silicone gels.

The elastomeric material may be less sticky than conventional thermoset cushioning gels. Elastomeric materials may not generally be adhesively sticky, but instead may be mildly tacky. The composition of the elastomeric material may have a selected stickiness or tackiness. As the resin, if present in the elastomeric material, may function as a tackifier, the amount of resin used in the elastomeric material composition may be increased to increase the stickiness or tackiness of the elastomeric material. For example, the elastomeric material may have a lower stickiness than gel used in conventional cushioning elements. For some applications, the elastomeric material may have low tackiness and high tensile strength (e.g., from about 1.4 MPa (200 psi) to about 14 MPa (2000 psi)). In some embodiments, the elastomeric material of the cushioning element 102 may have sufficient tackiness to removably adhere to (e.g., to grip) a surface such as hardwood, tile, linoleum, carpet, leather, polyvinyl chloride, fabric, or other covering provided on a flooring surface or seating surface. In other words, the elastomeric material may have sufficient tackiness to provide a non-slip surface and prevent the cushion 100 from sliding when disposed over a surface. The elastomeric material may exhibit a blocking effect when placed against a polymeric surface, such as linoleum, polyvinyl chloride, and the like. This blocking effect may cause the elastomeric material to stick to the polymeric surface.

The elastomeric material may provide a non-slip or high friction surface when the cushion 100 is disposed over a surface, such as flooring. In other words, the elastomeric material may prevent the cushion 100 from sliding when placed against a surface for use. The elastomeric material may exhibit a higher coefficient of friction than conventional thermoset cushioning gels against surfaces, such as tile, concrete, hard wood, leather, linoleum, granite, etc. The composition of the elastomeric material may have a selected coefficient of static friction. For example, the elastomeric material may have a coefficient of static friction greater than 0.6. In some embodiments, the elastomeric material may have a coefficient of static friction greater than 0.8.

With continued reference to FIG. 2, the cushioning element 102 may be formed such that a volume of the cushioning element 102 occupied by elastomeric material may be less than about 75 percent. In some embodiments, the cushioning element 102 may be occupied by about 15 percent to about 50 percent elastomeric material by volume. The remainder of the volume of the cushioning element 102 may occupied by air or gas in the voids 108.

The cushioning element 102 may be secured (e.g., bonded) directly to the top layer 104. For example, the top surface of the cushioning element 102 may be heat-fused to the top layer 104. In other embodiments, the cushioning element 102 may be secured to the top layer 104 by an over-molding process.

The top layer 104 may comprise a flexible material such that the top layer 104 may be conformed to a selected shape of the top surface 114 of the walls 112 of elastomeric material. In some embodiments, the top layer 104 may be formed of one or more of fabric, foam, or another material. In some embodiments, the top layer 104 may be a woven fabric, a knitted fabric, a non-woven fabric, a tufted material (e.g., carpet), a breathable material, a porous foam having an open (e.g., connected) pore network, a polymeric material, etc. A woven fabric may include any fabric having interlaced yarn, strands, threads, or other fibers. A knitted fabric may include any fabric having a series of connected loops of yarn, thread, or other fibers. A non-woven fabric may include any fabric having fibers or filaments entangled and mechanically, thermally, or chemically bonded together. A tufted material may include any material having a pile of yarn, strands, threads, twisted tufts, or other fibers attached to a backing. A breathable material may include any material configured to allow gases (e.g., air and vapors, such as water vapor) to pass there through. The porous foam may include any natural or synthetic material having interconnected pores. The polymeric material may comprise a thermoplastic polymer, such as polyurethane.

In some embodiments, the top layer 104 may be a permeable material such that the top layer 104 is permeable to the elastomeric material of the cushioning element 102 in a molten state. For example, the top layer 104 may define a plurality of voids or cavities, such as interconnected pores, spaces between fibers or threads, etc., extending partially or completely through the top layer 104. The cushioning element 102 may be secured to the top layer 104 by permeating voids in the top layer 104 with molten elastomeric material. In other embodiments, the top layer 104 may be impermeable to the elastomeric material of the cushioning element 102 in a molten state.

In some embodiments, the cushioning element 102 may be attached indirectly to the top layer 104 by the intermediate layer 106. The intermediate layer 106 may be secured (e.g., bonded) to the top layer 104. For example, the intermediate layer 106 may be laminated to the top layer 104 by an adhesive bonding process, a thermal bonding process, a welding process, and the like. When the intermediate layer 106 is present, the cushioning element 102 may be secured (e.g., bonded) directly to the intermediate layer 106. For example, the top surface of the cushioning element 102 may be heat-fused to the intermediate layer 106. In other embodiments, the cushioning element 102 may be secured to the intermediate layer 106 by an over-molding process.

In some embodiments, the intermediate layer 106 may be a permeable material such that the intermediate layer 106 is permeable to the elastomeric material of the cushioning element 102 in a molten state. The intermediate layer 106 may be formed of a material similar to the top layer 104. For example, the intermediate layer 106 may comprise a woven fabric, a knitted fabric, a non-woven fabric, a tufted material (e.g., carpet), a breathable material, a porous foam having an open (e.g., connected) pore network, etc. The cushioning element 102 may be secured to the intermediate layer 106 by permeating voids in the intermediate layer 106 with molten elastomeric material. In other embodiments, the intermediate layer 106 may be impermeable to the elastomeric material of the cushioning element 102 in a molten state.

In some embodiments, the materials of the top layer 104 and the intermediate layer 106 (i.e., the cover 110) may be selected based on the intended use of the cushion 100. For example, when the cushion 100 is intended for use as a cushioned floor mat, such as a bath mat or kitchen mat, and may be wetted (e.g., exposed to water or other fluids), the materials of the cover 110 may be waterproof, water resistant, water repellant, or water absorbent. In other words, the cover 110 may be formulated to be wetted without degradation of the selected materials. The material of the cover 110 may further be selected such that the cushion 100 may be washed manually or mechanically with or without soap (e.g., detergent) without degradation of the selected materials.

FIGS. 3 through 7 illustrate a simplified view of the bottom surface 107 of the cushion 100 and exemplary configurations of the cushioning element 102 according to some embodiments of the present disclosure.

Figure 3:
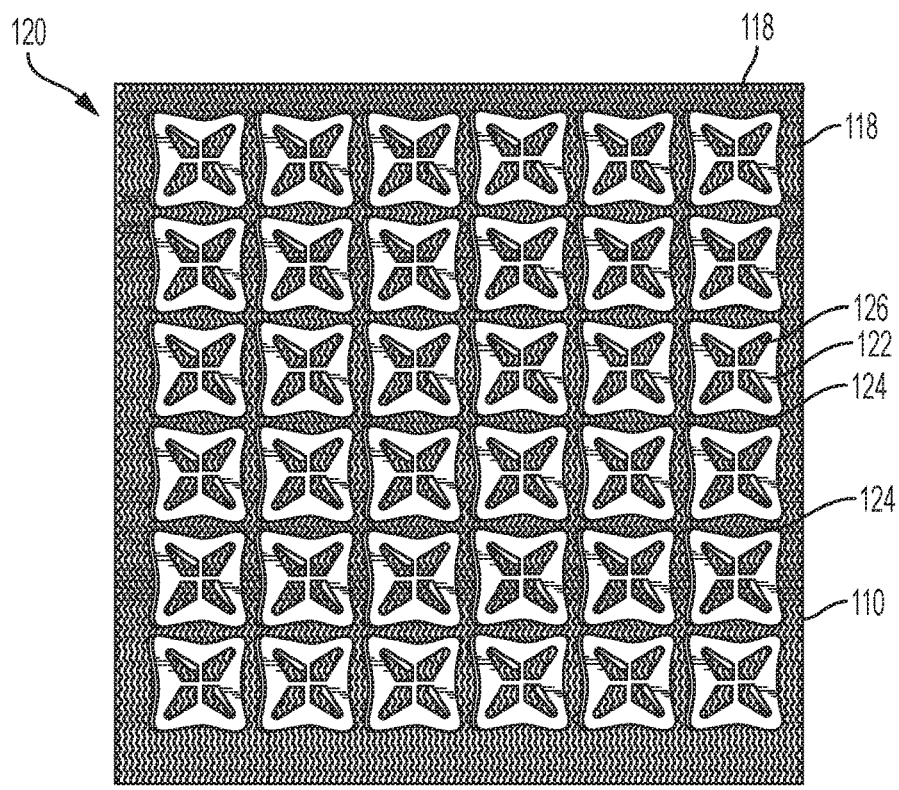
FIGS. 3 through 6 are bottom views of cushioning elements of a cushion according to embodiments of the present disclosure.

FIG. 3 illustrates a bottom view of a cushioning element 120 comprising a plurality of discrete segments 122 of elastomeric material secured to the cover 110. Surfaces of the discrete segments 122 define at least one breathable gap 124 or void. The breathable gap 124 may be configured to allow gases, such as air, water vapor, etc., to pass between adjacent discrete segments 122. The discrete segments 122 may define one or more internal gaps 126 within the discrete segments 122. For example, in the cushioning element 120, each discrete segments 122 may define four internal gaps 126 having a generally quadrilateral "arrowhead" shape, but internal gaps 126 may have any selected shape. Additional configurations of the cushioning element 120 are described in, for example, U.S. Patent Pub. No. U.S. 2012/0244312 A1, titled "Breathable Gel," published Sep. 27, 2012 in the name of Pearce at al., the entire disclosure of which is hereby incorporated herein in its entirety by this reference.

Dimensions and placement of the discrete segments 122 may be selected such that the gap 124 has dimensions that allow gas to flow between the discrete segments 122. The dimensions and placement of the discrete segments 122 may also be selected such that the gap 124 has dimensions sufficient to allow the discrete segments 122 to deflect or deform under an applied load. In some embodiments, the square cross-section of the discrete segments 122 may have a length and a width (e.g., dimensions in directions generally parallel to a surface of the cover 110). The length and width may be from about 2.5 mm (about 0.1 inch) to about 127 mm (about 5 inches). In some embodiments, the length and width may be about 25.4 mm (about 2 inches). The thickness of the discrete segment 122 (e.g., dimension in a direction generally perpendicular to the surface of the cover 110) may be from about 1.3 mm (about 0.05 inch) to about 76 mm (about 3 inches). In some embodiments, the thickness may be about 3.2 mm (about 0.125 inch).

Figure 4:
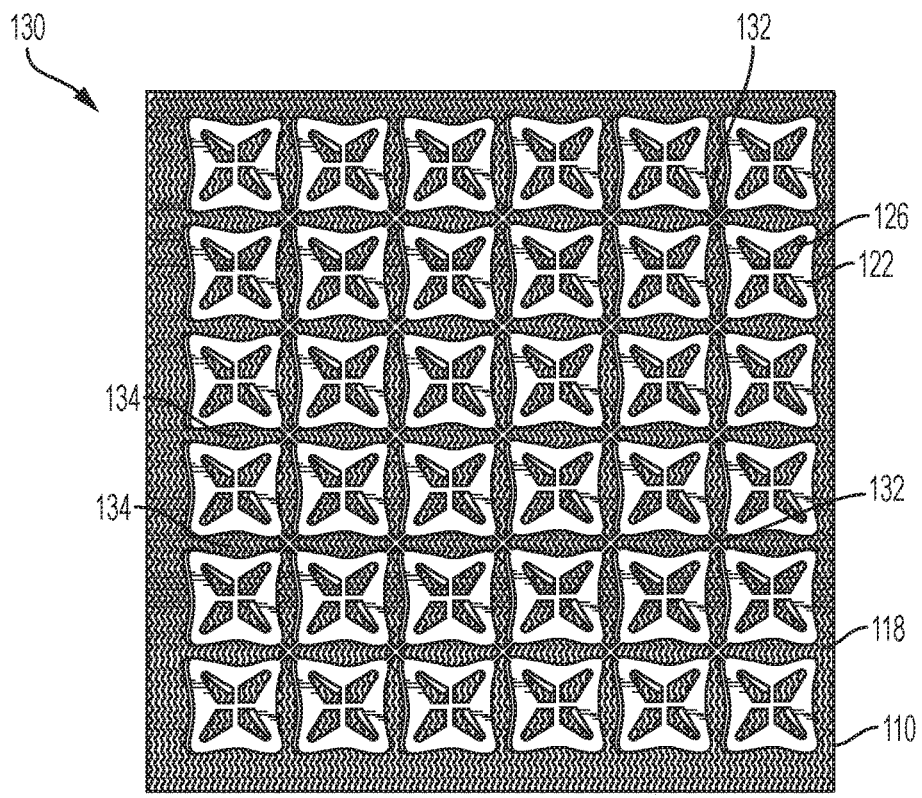

FIG. 4 illustrates a cushioning element 130 that may be substantially similar to the cushioning element 120 of FIG. 3. The cushioning element 130 may comprise segments 122 connected by a plurality of buckling walls 132, such that the cushioning element 130 comprises a continuous segment of elastomeric material. The segments 122 and the buckling walls 132 may define at least one gap 134 or void. The buckling walls 132 may connect the corners of the segments 122, and may extend diagonally between the segments 122. In some embodiments, the cushioning element 130 may be secured to the cover 110 and permeate voids 118 of the cover 110.

The buckling walls 132 may have dimensions and placement such that the gaps 134 have dimensions sufficient to allow gas to flow between the gel segments 122 and buckling walls 132. The dimensions and placement may also be sufficient to allow the segments 122 and buckling walls 132 to deflect or deform under an applied load. The buckling walls 132 may have a width (e.g., dimension in a direction generally parallel to a surface of the cover 110) and a thickness (e.g., dimension in a direction generally perpendicular to a surface of the cover 110). The width may be from about 3.2 mm (about 0.125 inch) to about 12.7 mm (about 0.5 inch). In some embodiments, the width may be about 0.25 inch. The thickness may be from about 1.3 mm (about 0.05 inch) to about 76 mm (about 3 inches). In some embodiments, the thickness may be about 3.2 mm (about 0.125 inch).

Figure 5:
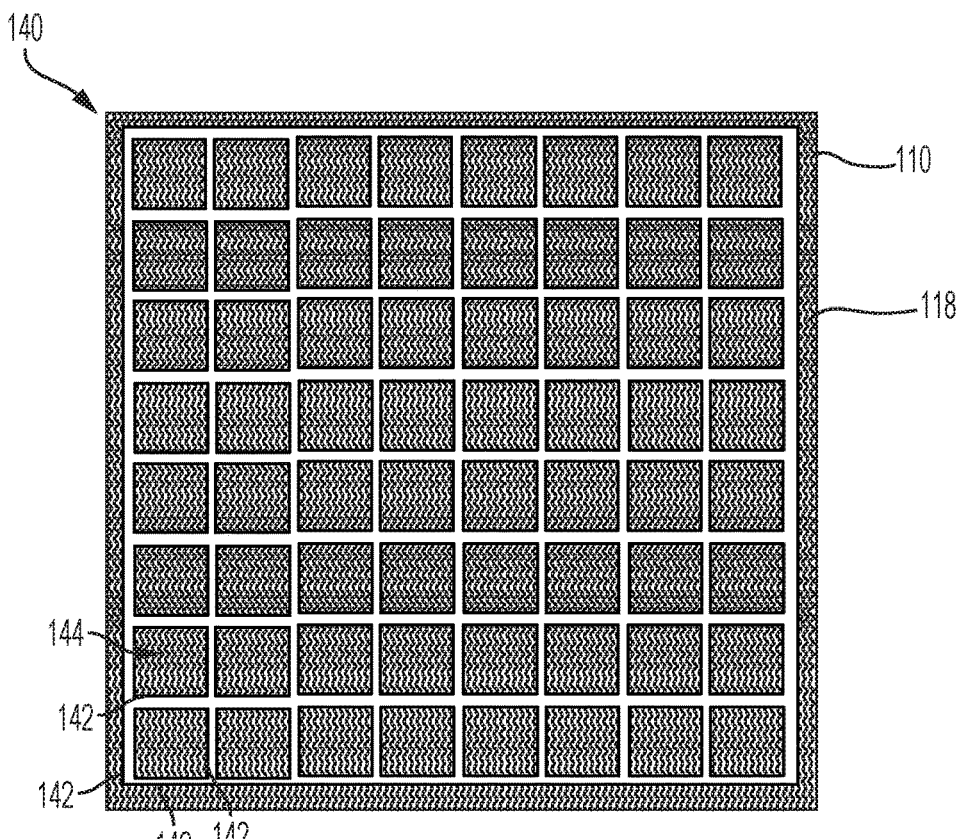

FIG. 5 illustrates a cushioning element 140 having intersecting buckling walls 142. The buckling walls 142 may be interconnected to one another and may define hollow columns 144 or voids. The buckling walls 142 may be oriented in two directions, intersecting at right angles, and defining square voids 144. However, the buckling walls 142 may intersect at other angles and define voids 144 of other shapes, such as triangles, parallelograms, hexagons, etc., and combinations thereof. In embodiments in which the buckling walls 142 define voids 144 having a triangular shape, additional buckling walls 142 may be provided that extend diagonally from corner-to-corner of the buckling walls 142 having square voids 144 as illustrated in FIG. 5. Such additional buckling walls 142 may serve to stiffen the cushioning element 140 such that the buckling walls 142 may be less likely to bunch up laterally.

The dimensions of the buckling walls 142 and the voids 144 may be selected such that the buckling walls 142 have sufficient space to deflect or deform under an applied load. The buckling walls 142 may have a width (e.g., dimension in a direction generally parallel to a surface of the cover 110) and a thickness (e.g., dimension in a direction generally perpendicular to a surface of the cover 110). The width may be from about 0.5 mm (about 0.02 inch) to about 5 mm (about 0.2 inch). In some embodiments, the width may be about 1.52 mm (about 0.06 inch). The thickness may be from about 5 mm (about 0.2 inch) to about 25.4 mm (about 1 inch). In some embodiments, the thickness may be 12.7 mm (about 0.5 inch). In other embodiments, buckling walls 142 may taper in thickness at a periphery of the cushion 100 as illustrated in FIG. 1. In such embodiments, the thickness may extend to a minimum thickness of about 1 mm (about 0.04 inch) or less. The voids 144 may be regularly spaced apart. For example, a pitch between adjacent voids 144 may be substantially uniform. As used herein, the term "pitch" refers to the distance between identical points in two adjacent (i.e., neighboring) voids. The pitch may be from about 1 mm (0.04 inch) to about 2.54 mm (about 0.1 inch) and about 25.4 mm (about 1 inch).

Figure 6:
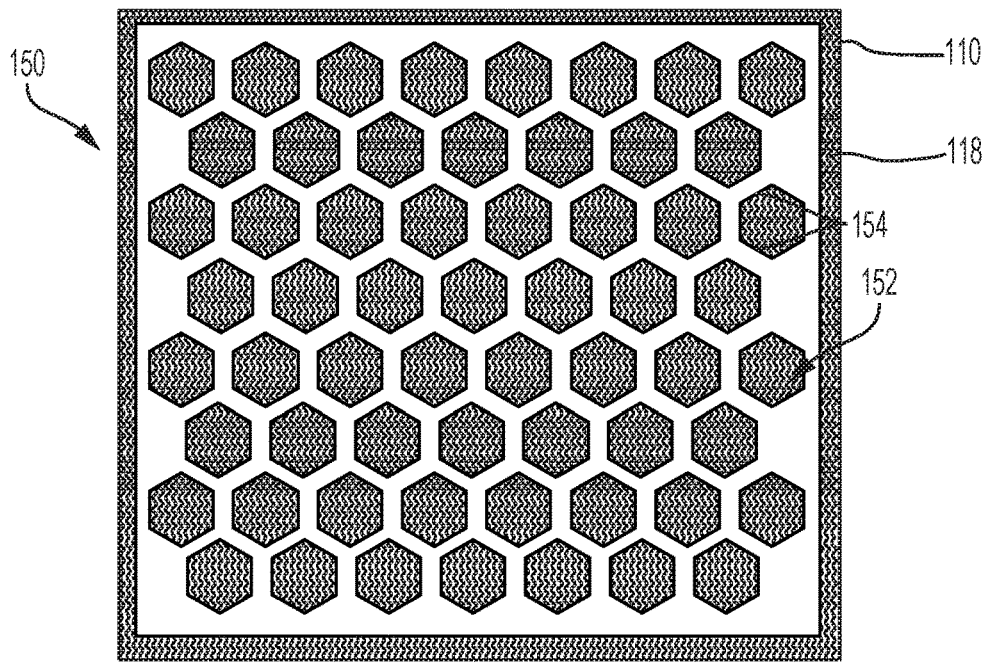

FIG. 6 illustrates a cushioning element 150 having a plurality of voids 152 formed therein. The voids 152 have column walls 154 that are hexagonal in configuration. However, the column walls 154 may have other configurations, such as circular, triangular, etc. Additional configurations of the cushioning elements 140, 150 are described in, for example, U.S. Pat. No. 5,749,111, titled "Gelatinous Cushions with Buckling Columns," issued May 12, 1998; U.S. Pat. No. 6,026,527, titled "Gelatinous Cushions with Buckling Columns," issued Feb. 22, 2000; and U.S. Pat. No.

7,076,822, titled "Stacked Cushions," issued Jul. 18, 2016; the entire disclosure of each of which is hereby incorporated herein by this reference.

Figure 7:
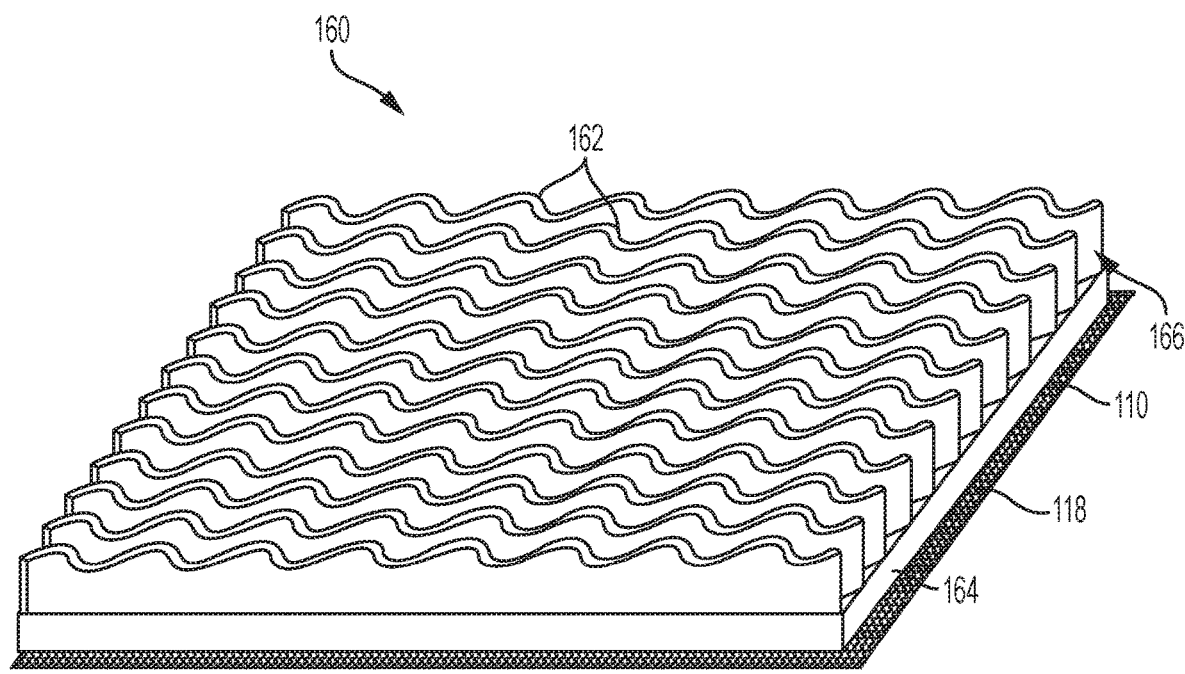
FIG. 7 is a perspective view of a cushioning element of a cushion according to an embodiment of the present disclosure.

FIG. 7 illustrates a cushioning element 160 having a plurality of undulating (e.g., sine wave) structures 162 of elastomeric material formed over a support layer 164 of elastomeric material. The support layer 164 may have a generally rectangular cross-sectional shape. The support layer 164 may at least substantially fill voids 166 between the undulating structures 162. The undulating structures 162 may also be configured as described in, for example, U.S. Pat. No. 6,865,759, titled "Cushions with Non-intersecting-columnar Elastomeric Members Exhibiting Compression Instability," issued Mar. 15, 2005; U.S. Pat. No. 8,434,748, "Cushions Comprising Gel Springs," issued May 7, 2015; U.S. Pat. No. 8,628,067, titled "Cushions Comprising Core Structures and Related Methods," issued Jan. 14, 2014, the entire disclosure of each of which is incorporated herein by this reference.

In other embodiments, the cushioning element may comprise a multi-level buckling cushioning element, such as stacked layers of buckling walls. Multi-level buckling cushioning elements are described in, for example, U.S. Pat. No. 7,730,566, titled "Multi-walled Gelastic Material," issued Jun. 8, 2010 (hereinafter "the '566 Patent"); U.S. Pat. No. 7,823,233, titled "Multi-Walled Gelastic Material," issued Nov. 2, 2010 (hereinafter "the '233 Patent"); U.S. Pat. No. 7,827,636, titled "Multi-Walled Gelastic Material," issued Nov. 9, 2010 (hereinafter "the '636 Patent"); and U.S. Pat. No. 8,607,387, titled "Multi-Walled Gelastic Mattress System," issued Dec. 17, 2013 (hereinafter "the '387 Patent"); the entire disclosure of each of which is hereby incorporated herein by this reference. The multi-level buckling cushioning elements may be used to form the cushion 100 of the present disclosure. In some embodiments, the cover 110 may attached over the multi-level buckling cushioning elements as the multi-level buckling cushioning elements are oriented and illustrated in the figures of the '566 Patent, the '233 Patent, the '636 Patent, and the '387 Patent. In other embodiments, the multi-level buckling cushioning elements illustrated in the figures of the '566 Patent, the '233 Patent, the '636 Patent, and the '387 Patent may be inverted and the cover 110 attached to the opposite surface than that illustrated in the figures.

By way of example and not limitation, the cushioning element 102 of the present disclosure may offer certain advantages over conventional cushioning elements used in mats or pads. Conventional cushioning elements may comprise a solid layer of cushioning material lacking voids formed therein. For example, the mat or pad may include a solid layer of foam or gel. Alternatively, conventional cushioning elements may have voids formed in a gel layer; however, additional layers of material may be provided over the cushioning element to provide a solid non-slip surface. Additionally, conventional mats or pads may include texturing on the layer contacting a floor or may have devices such as suction cups or silicone dots attached to a bottom surface of the mat to prevent the mat or pad from moving during use. The cushioning element 102 of the present disclosure offers reduced production costs due to the reduced volume of elastomeric material used to form the cushioning element 102 while providing a non-slip or high friction surface without additional material layers, texturing, or other devices formed over the cushioning element 102.

Methods of forming the cushion 100 may include over-molding the elastomeric material of the cushioning element 102 and the cover 110. Methods of forming the cushion 100 further include heat-fusing the elastomeric material of the cushioning element 102 to the cover 110. For example, the cushioning element 102 may be formed by melting elastomeric material and disposing the elastomeric gel within a mold. The molten elastomeric material may be forced under pressure into the plurality of voids or cavities in the cover 110. Upon cooling, the elastomeric material may solidify and bond to the cover 110. As a portion of the elastomeric material of the cushioning element 102 may be disposed within the voids, the cushioning element 102 may be secured to the cover 110.

In some embodiments, the cushioning element 102 may be over-molded or heat-fused to the cover 110 by an injection molding process. By way of non-limiting example, the injection molding apparatus described in U.S. Patent Application Pub. No. 2014/0183789 may be used to over-mold or heat-fuse the cushioning element 102 and the cushion 100.

FIGS. 8A through 8D are cross-sectional views of a mold 202 at different stages of a process of forming the cushion 100. The mold 202 may have a first plate 204 and a second plate 206. The first plate 204 of the mold 202 may be used to shape the elastomeric material in the desired final shape of the cushioning element 102.

Figure 9:
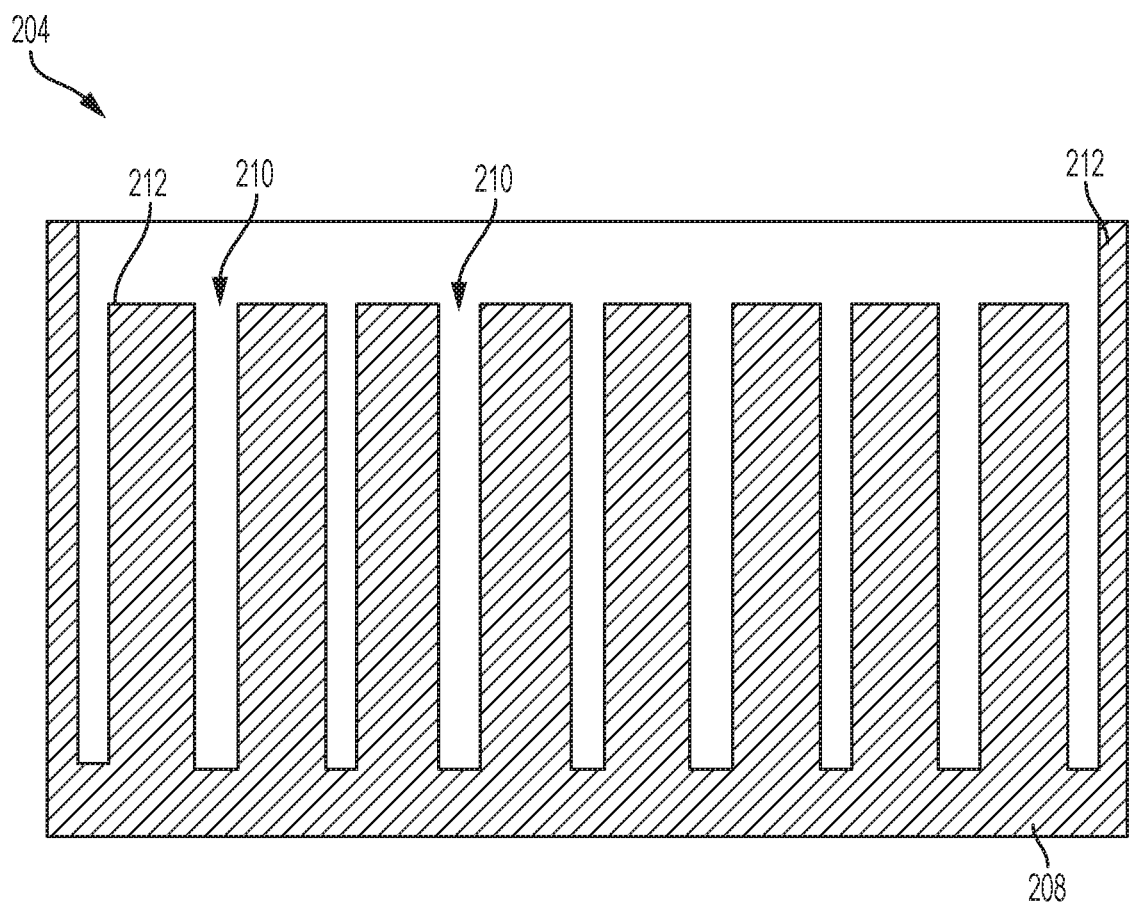
FIG. 9 illustrates a cross-sectional view of a mold for forming a cushioning element according to an embodiment of the present disclosure.

A partial cross-sectional view of the first plate 204 is illustrated in FIG. 9, which may be used to form the cushioning element 140 of FIG. 5. The first plate 204 may include a body 208 that defines at least one cavity 210. Walls 212 around the cavity 210 may at least partially constrain molten elastomeric material within the cavity 210, and may occupy a position corresponding to a position of a void 108 of the cushioning element 102 (FIG. 2). The cavity 210 may be machined into the body 208 to have any desired shape of the cushioning elements including, but not limited to, cushioning elements as illustrated in FIGS. 3 through 7.

The second plate 206 may serve as a backing plate of the first plate 204 of the mold 202. The second plate 206 may also be used to shape the cover 110 into the desired final shape (FIG. 1). The second plate 206 may comprise a recess 214. The recess 214 may have any selected shape to conform and provide the cover 110 in a final shape. For example, the second plate 206 illustrated in FIGS. 8A through 8C may be used to form the tapered edge 103 and flat top surface 105 of the cushion 100 as illustrated in FIG. 1. However, the recess 214 of the second plate 206 may have any shape desired to provide the cushion 100 with its final shape.

Figure 8A:
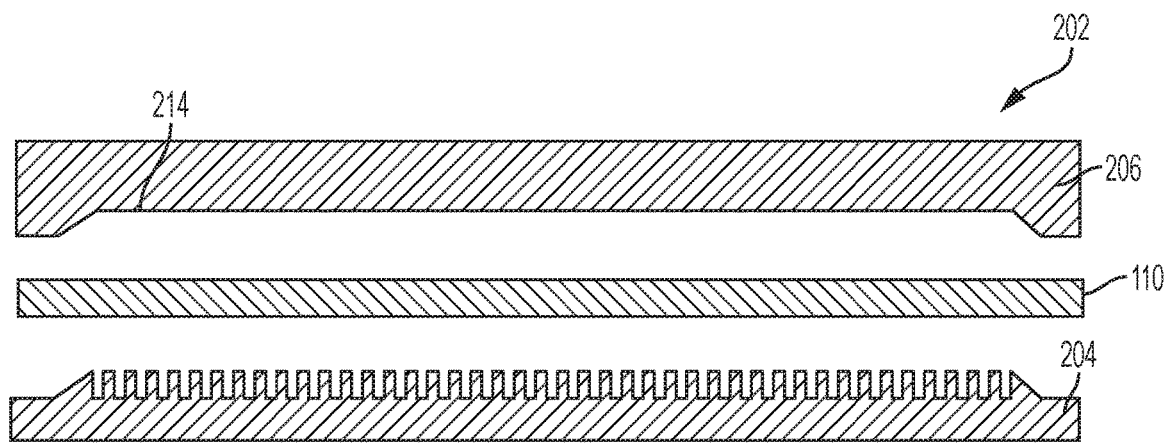
FIGS. 8A through 8D illustrate a method of forming the cushion of FIG. 1 according to an embodiment of the present disclosure.

With continued reference to FIG. 8A, the cover 110 may be provided between the first plate 204 and the second plate 206 of the mold 202.

Figure 8B:
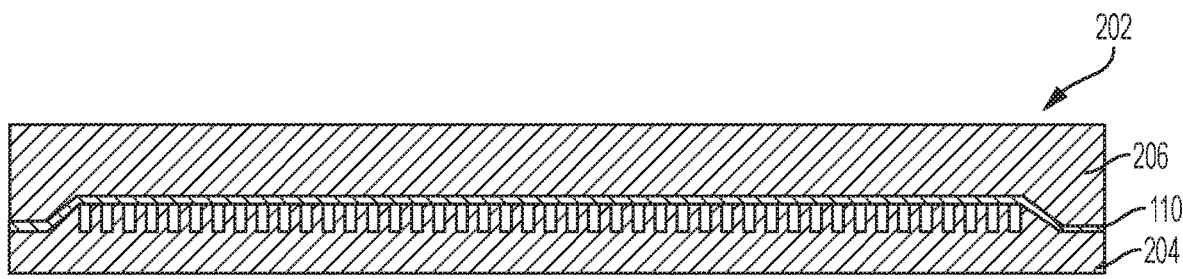

With reference to FIG. 8B, the mold 202 may be closed such that the cover 110 may be compressed and formed into the final shape of the cushion 100 by the first plate 204 and the second plate 206. The first plate 204 and the second plate 206 may be formed to have complementary surfaces such that the first plate 204 and the second plate 206 fit together when the mold 202 is closed. For example, the first plate 204 may have a convex portion that fits into a concave portion of the second plate 206. In other embodiments, the first plate 204 may have a concave portion that a convex portion of the second plate 206 fits into.

A mixture of the elastomeric material may be melted and mixed in a heated extruder and may be pumped into a piston chamber. From the piston chamber, the molten elastomeric material may be injected into the mold 202. Pressure may be applied to promote the flow of molten elastomeric material. Pressure may further be applied to promote permeation of the molten elastomeric material into the cover 110. In some embodiments, the elastomeric material may partially permeate the cover 110. In other embodiments, the elastomeric material may completely permeate the cover 110.

In some embodiments, the molten elastomeric material may be injected into the cavities 210 of the first plate 204 such that the molten elastomeric material may be formed on a side of the cover 110 on which the cushioning element 102 is secured in a final form of the cushion 100. In other embodiments, the molten elastomeric material may be injected into the mold 202 on a side of the cover 110 opposite which the cushioning element 102 may be secured in the final form of the cushion 100. In such embodiments, the molten elastomeric material may be injected completely through the cover 110 before being injected into the cavities 210. The molten elastomeric material may be injected under pressure to promote permeation of the molten elastomeric material into the cover 110. The molten elastomeric material is allowed to cool and solidify. Upon solidification, the cushioning element 102 may be secured to the cover 110.

Figure 8C:
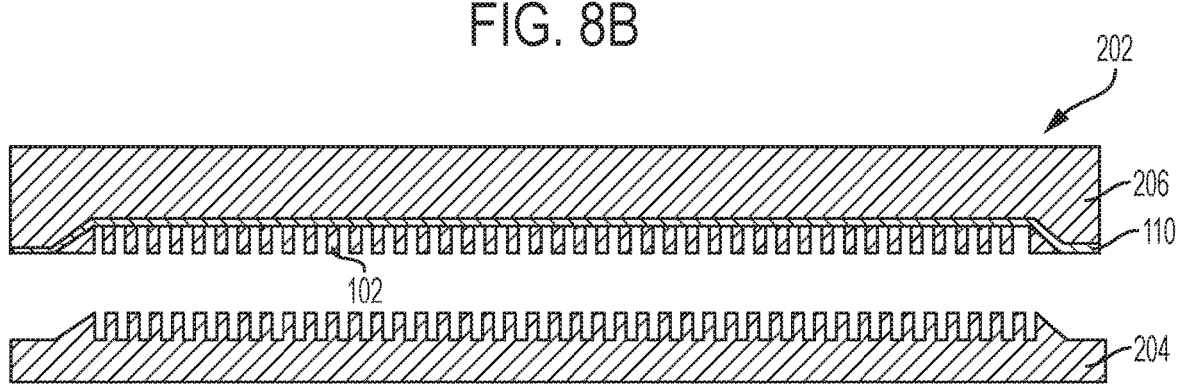
Figure 8D:
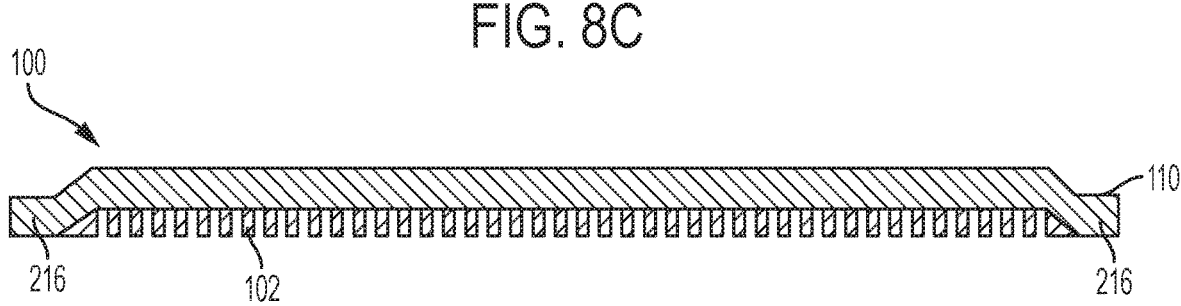

After the elastomeric material has solidified, the mold 202 may be separated from the cover 110 as illustrated in FIG. 8C. In other words, the mold 202 may be opened such that the first plate 204 and the second plate 206 are separated. The cushion 100 may be removed from the mold 202 as illustrated in FIG. 8D. After the cushion 100 is removed from the mold 202, the cushioning element 102 may be formulated and configured to maintain the cover 110 in the selected shape of the recess 214 of the second plate 206.

In some embodiments, additional processing steps may be performed to enhance the aesthetics of the cushion 100. For example, excess material 216 of the cover 110 may be removed. Excess material 216 may be removed from a peripheral edge of the cushion 100 adjacent the cushioning element 102. Excess material 216 may be removed such that the edge of the cushion 100 may be located adjacent to an edge of the cushioning element 102. In other embodiments, excess material 216 may be removed such that a portion of the cover 110 remains without a portion of the cushioning element 102 attached thereto. For example, excess material 216 of the cover 110 may be manually or mechanically cut or trimmed away after the molding process. In other embodiments, excess material 216 of the cover 110 may be removed prior to providing the cover 110 in the mold 202.

Edging 109 may be provided around the periphery of the cushion 100 (FIG. 1). Edging 109 may be provided on excess material 216 of the cover 110 without a portion of the cushioning element 102 attached thereto. In other embodiments, edging 109 may be sewn or stitched through the elastomeric material of the cushioning element 102.

In some embodiments, the cushion 100 may be formed as part of a continuous-flow operation. For example, in a process of forming the cushion 100 and cushioning element 102 using the mold 202 as illustrated in FIGS. 8A through 8C, the cushioning element 102 may be formed and secured to a portion of cover 110. The mold 202 may be removed from the cover 110 and the cushioning element 102. The mold 202 and/or the cover 110 may be moved relative to each other (e.g., the mold 202 may be indexed to another location of the cover 110 at which a cushioning element has not been formed). Additional cushioning elements 102 may be formed on the cover 110. For example, the mold 202 may include a rotating drum or a stationary drum. The cushioning element 102 may be applied to or through the cover 110 as the cover 110 is rotated around with the rotating drum or passes the stationary drum. Portions of the rotating drum may be heated and/or cooled to facilitate the formation of the cushioning element.

In some embodiments, the cover 110 may be disposed in a roll. For example, cushioning element 102 may be placed on a material by a pick-and-place apparatus, such as described in U.S. Pat. No. 7,000,966, titled "Pick-and-Place Tool," issued Feb. 21, 2006, the entire disclosure of which is incorporated herein by this reference. Voids may be formed by controlling the placement of cushioning element 102. The cushioning element 102 may be secured to the cover 110 by heating the cushioning element 102 and/or the cover 110 to a temperature near a melting point of the elastomeric material. A portion of the cushioning element 102 may penetrate the cover 110 and fuse the cushioning element 102 to the cover 110.

By way of example and not limitation, the cushioning element 102 of the present disclosure may offer certain further advantages over conventional cushioning elements used in mats or pads. For example, production costs may be reduced by forming the cushion 100 by injection molding as compared to other methods such as polymer casting of cross-linked gel materials used to form conventional cushioning elements. The elastomeric material of the present disclosure may be recycled by, for example, remelting and remolding the elastomeric material to further reduce production costs compared to cross-linked castable gel material, which may not be recycled. Further, the method of the present disclosure reduces the number of production steps by not requiring a cover to be provided over both surfaces (e.g., the top surface 105 and the bottom surface 107) of the cushioning element 102. Further, the injection molding process of the present disclosure using the injection molding apparatus described in U.S. Patent Application Pub. No. 2014/0183789 may reduce the amount of factory floor space required to manufacture the cushions.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A cushioned floor mat, comprising:
a cushioning element comprising a plurality of segments comprising an elastomeric material, at least one top of tops of the plurality of segments defining a top of the cushioning element, bottom surfaces of the plurality of segments defining a bottom surface of the cushioning element, and gaps between adjacent segments of the plurality of segments extending and opening to the bottom surface of the cushioning element and to the top of the cushioning element; and
a cover comprising a material including voids, the cover positioned on the tops of the plurality of segments, upper ends of the gaps between the adjacent segments of the plurality of segments of the cushioning element exposing a bottom surface of the cover, the elastomeric material at the tops of the plurality of segments partially but not completely impregnating respective voids of the material of the cover, the elastomeric material within the voids of the material of the cover securing the cover to the top of the cushioning element, the cover also positioned over the gaps between the adjacent segments.

2. The cushioned floor mat of claim 1, wherein at least 80% of the bottom surface of the cushioning element is exposed such that when the cushioned floor mat is disposed over a floor at least 80% of the bottom surface of the cushioning element is in direct contact with the floor.

3. The cushioned floor mat of claim 1, wherein the cushioned floor mat lacks additional material formed over the bottom surface of the cushioning element such that when the cushioned floor mat is disposed over a floor substantially the entire bottom surface of the cushioning element directly contacts the floor.

4. The cushioned floor mat of claim 1, wherein the cushioning element is formulated to provide a non-slip surface against a floor when the bottom surface of the cushioning element is in direct contact with the floor.

5. The cushioned floor mat of claim 1, wherein the cushioned floor mat is disposed over a flooring surface, and wherein the bottom surface of the cushioning element is in direct contact with the flooring surface.

6. The cushioned floor mat of claim 1, wherein the elastomeric material comprises an elastomeric polymer and a plasticizer.

7. The cushioned floor mat of claim 1, wherein the top surfaces of the plurality of segments are heat-fused to the cover by at least one of an injection molding process or an overmolding process.

8. The cushioned floor mat of claim 1, wherein the plurality of segments comprise a plurality of discrete segments of elastomeric material.

9. The cushioned floor mat of claim 1, wherein the plurality of segments comprise a continuous segment of elastomeric material.

10. The cushioned floor mat of claim 1, wherein at least 60% of a bottom surface of the cushioning element is exposed such that when the cushioned floor mat is disposed over a floor at least 60% of the bottom surface of the cushioning element is in direct contact with the floor.

11. The cushioned floor mat of claim 1, wherein the cushioning element includes a taper at a periphery thereof such that at least a portion of a top surface of the cushioning element slopes toward a floor when the cushioned floor mat is disposed over the floor.

12. A cushioned floor mat, comprising:
a cushioning element comprising a plurality of walls defined by an elastomeric material, at least one top of tops of the plurality of walls defining a top of the cushioning element, bottom surfaces of the plurality of walls defining a bottom surface of the cushioning element, and gaps between adjacent walls of the plurality of walls extending and opening to the bottom surface of the cushioning element and to the top of the cushioning element; and
a cover comprising a material including voids, the cover positioned on the tops of the plurality of walls, upper ends of the gaps between the adjacent walls of the plurality of walls of the cushioning element exposing a bottom surface of the cover, the elastomeric material at the tops of the plurality of walls partially but not completely impregnating respective voids of the material of the cover, the elastomeric material within the voids of the material of the cover securing the cover to the top of the cushioning element, the cover also positioned over the gaps between the adjacent walls.

13. The cushioned floor mat of claim 12, wherein the plurality of walls of the cushioning element are interconnected.

14. The cushioned floor mat of claim 13, wherein the plurality of walls are continuous with each other.

15. The cushioned floor mat of claim 13, wherein the gaps are completely laterally surrounded by interconnected walls of the plurality of walls.

16. The cushioned floor mat of claim 12, wherein the plurality of walls comprise a plurality of discrete segments.

17. The cushioned floor mat of claim 12, wherein the cushioned floor mat lacks additional material formed over the bottom surface of the cushioning element such that when the cushioned floor mat is disposed over a floor substantially the entire bottom surface of the cushioning element directly contacts the floor.

18. The cushioned floor mat of claim 17, wherein the elastomeric material is formulated to provide a non-slip surface against the floor when the bottom surface of the cushioning element is in direct contact with the floor.

19. The cushioned floor mat of claim 12, wherein the top surfaces of the plurality of walls are secured to the cover while molding at least one of the cover and the plurality of walls.

20. The cushioned floor mat of claim 12, wherein the cushioning element includes a taper at a periphery thereof.

* * * * *